(12) United States Patent
Masuda et al.

(10) Patent No.: US 6,707,968 B2
(45) Date of Patent: Mar. 16, 2004

(54) OPTICAL WAVEGUIDE Y JUNCTION

(75) Inventors: Michiya Masuda, Yokohama (JP); Fumio Takahashi, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 418 days.

(21) Appl. No.: 09/860,176

(22) Filed: May 16, 2001

(65) Prior Publication Data

US 2002/0018624 A1 Feb. 14, 2002

(30) Foreign Application Priority Data

May 17, 2000 (JP) ........................................ 2000-144402

(51) Int. Cl.⁷ ................................................. G02B 6/26
(52) U.S. Cl. ......................................................... 385/45
(58) Field of Search ........................................... 385/45

(56) References Cited

U.S. PATENT DOCUMENTS

| | | | | |
|---|---|---|---|---|
| 3,453,036 A | * | 7/1969 | Swope et al. | 385/45 |
| 5,133,029 A | * | 7/1992 | Baran et al. | 385/11 |
| 5,463,705 A | * | 10/1995 | Clauberg et al. | 385/14 |
| 5,511,142 A | | 4/1996 | Horie et al. | 385/129 |
| 5,528,708 A | * | 6/1996 | Van Der Tol | 385/14 |
| 6,542,670 B1 | * | 4/2003 | Takahashi et al. | 385/45 |

FOREIGN PATENT DOCUMENTS

| | | | |
|---|---|---|---|
| GB | 2 227 854 A | 8/1990 | |
| JP | 08-122547 | 5/1996 | |
| JP | 09-33740 | 2/1997 | |
| JP | 2000162454 A | * 6/2000 | G02B/6/122 |

OTHER PUBLICATIONS

Chan, Hau–Ping et al., "Design of 3–dB Integrated Optical Couplers in Asymmetric Branching Waveguides," *Jpn. J. Appl. Phys.*, vol. 31 (1992), pp. 1641–1642.

Lin, Han–Bin et al., "Novel Optical Single–Mode Asymmetric Y–Branches for Variable Power Splitting," *IEEE Journal of Quantum Electronics*, vol. 35, No. 7 (Jul. 1999), pp. 1092–1096.

Sewell, Phillip et al., "Bi–Oblique Propagation Analysis of Symmetric and Asymmetric Y–Junctions," Journal of Lightwave Technology, vol. 15, No. 4 (Apr. 1997), pp. 688–696.

Patent Abstracts of Japan, No. 06235842, Aug. 23, 1994.

Patent Abstracts of Japan, http://www1.ipdl.jpo.go.jp/PA1/result/detail/main/wAAAa26795DA408122547P1.htm.

Patent Abstracts of Japan, http://www1.ipdl.jpo.go.jp/PA1/result/detail/main/wAAAa26795DA409033740P1.htm.

\* cited by examiner

*Primary Examiner*—Frank G. Font
*Assistant Examiner*—Kaveh C Kianni

(57) ABSTRACT

In an optical waveguide Y junction, comprising an input waveguide path, a split portion having one end smoothly connected to an end of said input waveguide path, and a pair of bifurcated ends, and a pair of output waveguide paths each having an end smoothly connected to a corresponding one of said bifurcated ends of said split portion, the split portion defines a modified asymmetric Y-shaped waveguide path which is defined by modifying an original symmetric Y-shaped waveguide path having a substantially constant width by removing an asymmetric wedge-shaped section from a side of the split portion interposed between the output waveguide paths. Thus, simply by changing the inner profile of the split portion, a desired uneven split ratio can be achieved without providing a spread out split portion or requiring any abrupt change in the shape of the waveguide path. This contributes to the reduction in the loss of the signal light. Also, a desired split ratio can be readily achieved by suitably changing the dimensions of the wedge-shaped section. In particular, by selecting a wedge-shaped inner profile, the design and fabrication of the junction can be simplified.

9 Claims, 3 Drawing Sheets

OPTICAL WAVEGUIDE Y JUNCTION

TECHNICAL FIELD

The present invention relates to optical waveguides for use in optical components in the fields of optical communication and optical signal processing, and in particular to an optical waveguide Y junction for splitting input light received into an input waveguide path formed in a substrate into two parts.

BACKGROUND OF THE INVENTION

Conventionally, junctions such as Y junctions have been used as splitters in optical integrated circuits (optical ICs) for use in the field of optical communication or the like. Such an optical waveguide junction typically comprises a substrate consisting of quartz glass or silicon wafer, and a core and upper clad layer which are formed over the substrate via an optional buffer layer formed over the substrate.

The use of a Y junction is not limited to simple splitting of light, but is also found in permitting communication between a light receiving element such as a photodiode placed at the terminal end of one of the output waveguide paths, and a light emitting element such as a laser diode placed at the terminal end of the other output waveguide path. In such a case, if the junction is designed such that the power of the input light, for instance, having the power of 10, is split into two equal parts or 5 for each output waveguide path, only half the power of the light emitting element reaches the light receiving element. Therefore, it has been necessary to compensate for such a loss of power by using a relatively sensitive light receiving element or a relatively powerful light emitting element.

To mitigate such a problem of the prior art, it has been proposed, for instance in Japanese patent laid open publications No. 8-122547 and No. 9-33740, to change the split ratio, for instance from 5/5 to 6/4 so that more of the light from the input waveguide path may be conducted to the photodiode or the light receiving element, and the power loss may be minimized.

According to the structure disclosed in Japanese patent laid open publication No. 8-122547, the splitting portion spreads out, and one of the output waveguide paths extends along the spread out profile while the other output waveguide path extends along a curved path. In other words, the plan view shapes of the two output waveguide paths are differentiated from each other so that an uneven split ratio may be achieved.

According to the structure disclosed in Japanese patent laid open publication No. 9-33740, the center of the two output waveguide paths is offset with respect to the input light waveguide path. Such a device may be called as a Y junction type optical tap.

According to the structure disclosed in Japanese patent laid open publication No. 8-122547, the downstream end of the input light waveguide path spreads out before it changes into the output waveguide paths, and the spread out part of the waveguide paths changes the light into a multi-mode light. The longer the spread out portion is, the greater the proportion of the undesirable higher waveguide mode components becomes. If the incident point of the input light deviates from the center of the input waveguide path due to an unavoidable error in the connection of optical fibers and the mounting of the junction, such a deviation has a strong influence on the split ratio.

According to the structure disclosed in Japanese patent laid open publication No. 9-33740, a large split ratio can be achieved, but the presence of a stepped portion in the optical waveguide path causes a significant loss. When a gradually spreading out portion is provided instead of a stepped portion, the problems such as the generation of higher waveguide modes as well as undesirable changes in the split ratio due the offsetting of the incident light arises.

According to these structures, a small offset in the order of ±2 μm may well cause a deviation of ±10% or more in the split ratio.

It is conceivable to use optical fibers to split input light instead using a waveguide junction. In such a case, a pair of split optical fibers are required to be bonded to the input optical fiber, but a stable bonding is difficult to accomplish if the split ratio is not even as in the case of a 6/4 split ratio. A flawed bonding results in an unacceptably large loss, and a failure to achieve a desired split ratio.

BRIEF SUMMARY OF THE INVENTION

In view of such problems of the prior art, a primary object of the present invention is to provide an optical waveguide Y junction which can split an input light at a desired split ratio by using a simple structure A second object of the present invention is to provide an optical waveguide Y junction which can split an input light at a minimum loss.

A third object of the present invention is to provide an optical waveguide Y junction which can be fabricated relatively easily and at a high precision.

According to the present invention, such an object can be accomplished by providing an optical waveguide Y junction including an input waveguide path, a split portion for splitting a light input from the input waveguide path into two parts, and a pair of output waveguide paths for guiding the split parts of the input light, all formed in a substrate, characterized in that: the split portion has an outer profile which is symmetric with respect to a central axial line of the input waveguide path and identical to an outer profile of an optical waveguide Y junction for an even split ratio, and an inner profile which is asymmetric with respect to the central axial line so that light introduced from the input waveguide path may be split into the two output waveguide paths at an uneven split ratio. Preferably, the inner profile is defined by removing from a side of the split portion facing the output waveguide paths a wedge-shaped section having an oblique first side and a second side extending in parallel with the central axial line, on either side of the central axial line.

Thus, simply by changing the inner profile of the split portion, a desired uneven split ratio can be achieved without providing a spread out split portion or requiring any abrupt change in the shape of the waveguide path. This contributes to the reduction in the loss of the signal light. In particular, by selecting a wedge-shaped inner profile, the design and fabrication of the junction can be simplified. Also, a desired split ratio can be readily achieved by suitably changing the dimensions of the wedge-shaped section.

According to a certain aspect of the present invention, the optical waveguide Y junction comprises an input waveguide path; a split portion having one end smoothly connected to an end of the input waveguide path, and a pair of bifurcated ends; and a pair of output waveguide paths each having an end smoothly connected to a corresponding one of the bifurcated ends of the split portion; the split portion defining a modified asymmetric Y-shaped waveguide path which is defined by modifying an original symmetric Y-shaped waveguide path having a substantially constant width by removing an asymmetric wedge-shaped section from a side of the split portion interposed between the output waveguide paths.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
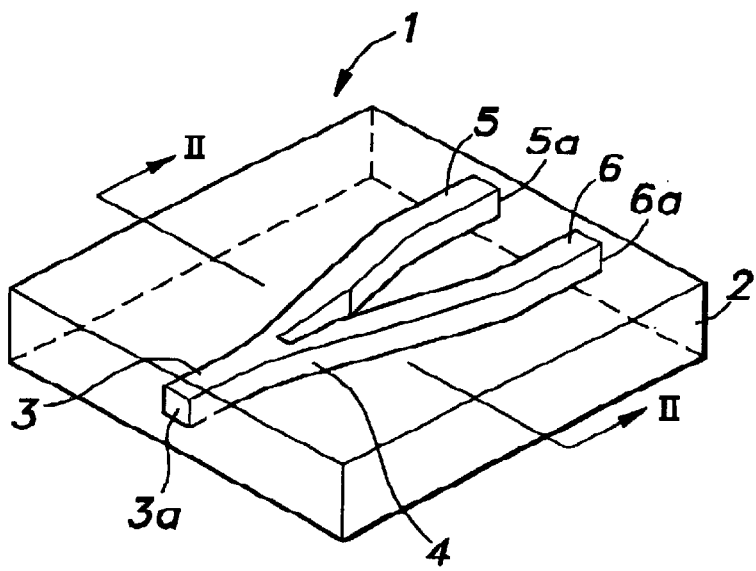
FIG. 1 is a perspective view of an optical waveguide Y junction embodying the present invention.

FIG. 1 is a perspective view of an optical waveguide Y junction 1 embodying the present invention. This optical waveguide Y junction 1 has an embedded structure including a core adapted to split an optical signal, and is suitable for use as a split junction for optical communication. A light signal which is supplied from an optical fiber to an end surface 3a of a core segment 3 serving as an input waveguide path shown on the left side of the drawing is conducted through a split portion 4, and reaches a core segment 5 serving as a output waveguide path. The signal is then obtained from an end surface (output end) 5a of the core segment 5 via an optical fiber or the like. A signal light which is supplied from a light emitting element such as a laser diode is supplied to an end surface 6a of a core segment 6 serving as another output waveguide path is again conducted through the split portion 4, and reaches the core segment 3. The signal is then obtained from the end surface (output end) 3a of the core segment 3 via an optical fiber or the like.

Figure 2:
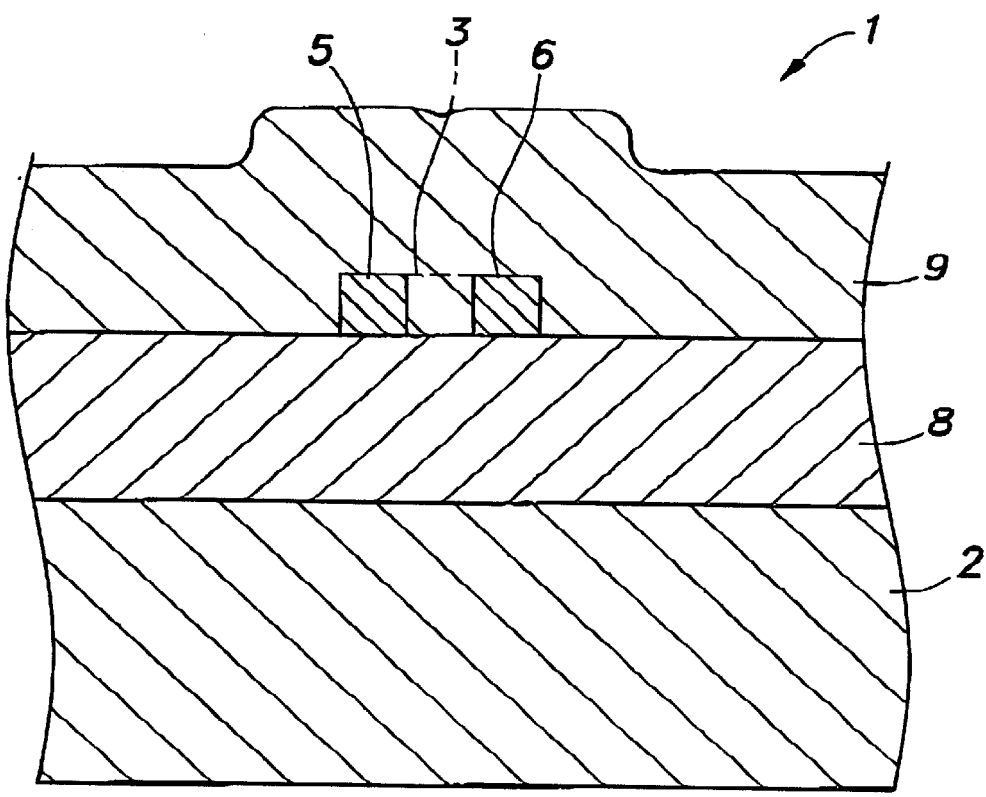
FIG. 2 is a sectional view of the optical waveguide Y junction taken along line II—II of FIG. 1.

FIG. 2 is a sectional view of the optical waveguide Y junction 1 taken along line II—II of FIG. 2. Core segments 3, 5 and 6 are formed over the surface of a substrate 2 consisting of quartz or other glass material or ceramic material via a buffer layer (lower clad layer) 8, and an upper clad layer 9 is placed over the core segments 3, 5 and 6 and the exposed part of the buffer layer 8. In this embodiment, the core segments 3, 5 and 6 and the upper clad layer 9 are formed over the substrate 2 via the buffer layer 8, but the core segments and upper clad layer may be formed directly over the substrate without requiring any buffer layer if the substrate is made of a low refraction index glass substrate such as quartz glass because the substrate serves the purpose of the buffer layer.

The buffer layer 8 is formed over the substrate 2 at a film thickness of approximately 25 $\mu$m. The core segments 3, 5 and 6 are each provided with a square cross section measuring 8 $\mu$m by 8 $\mu$m. The material of the core segments 3, 5 and 6 has a slightly higher refraction index than that of the buffer layer 8 and upper clad layer 9 so that an optical signal may be conducted through these core segments for optical communication. The upper clad layer 9 is formed over the buffer layer 8 and core segments 3, 5 and 6 so as to form a film having a thickness of 25 $\mu$m over them.

Figure 3:
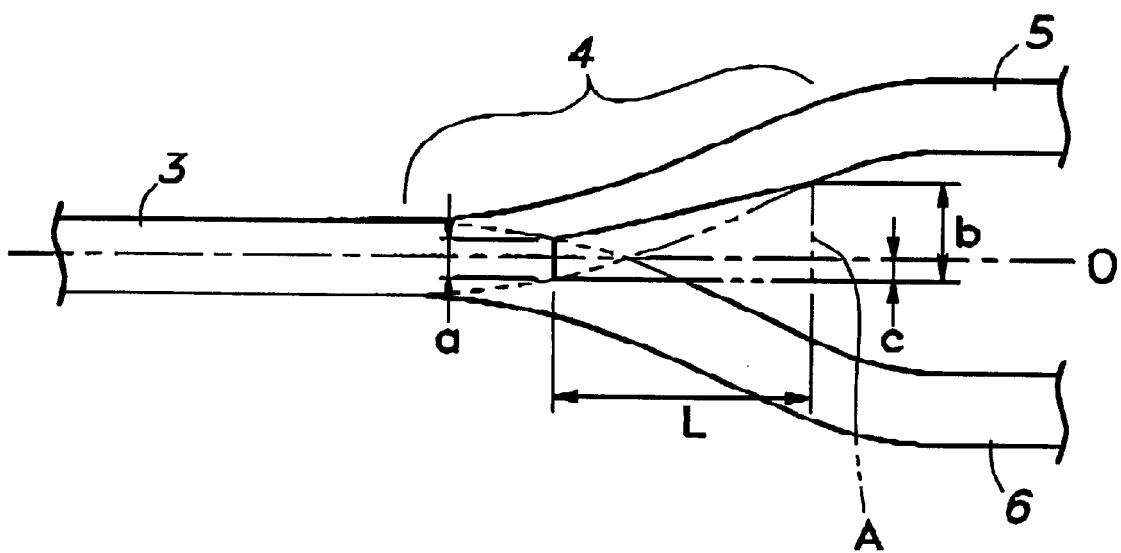
FIG. 3 is an enlarged fragmentary plan view of the optical waveguide Y junction shown in FIG. 1.

FIG. 3 is an enlarged plan view of an essential part of the optical waveguide Y junction 1, and shows the profile of the core segments 3, 5 and 6 in a pronounced manner. This optical waveguide Y junction 1 comprises a linear core segment 3 serving as an input waveguide path, a split portion 4 splitting the signal light from the input waveguide path, and a pair of core segments 5 and 6 serving as output waveguide paths each provided with a curved profile having a prescribed curvature for conducting the light split by the split portion 4. The profile of the overall wave guide path of in the split portion 4 may be defined as a modification from an original symmetric waveguide path which has a constant width, and smoothly split into two parts from an end smoothly connected to the core 3 serving as an input waveguide path to bifurcated ends smoothly connected to the cores 5 and 6 serving as output waveguide paths. The waveguide paths in the bifurcated parts of the split portion as well as the end portions of the cores 5 and 6 or the output waveguide paths are suitably curved so as to form generally smooth paths for the signal light. The core segment 5 serves as a waveguide path for conducting an optical signal from a light emitting element not shown in the drawings to a light receiving element not shown in the drawing via the core segment 3 and split portion 4. The core segment 6 serves as a waveguide path for conducting a signal light to a light receiving element not shown in the drawings via the split portion 4 and core segment 3.

According to the present invention, the optical wave guide path defined in the split portion 4 consists of a modified asymmetric Y-shaped waveguide path which is modified from the original symmetric waveguide path by removing an asymmetric wedge-shaped section from a side of the split portion interposed between the output waveguide paths. The original symmetric waveguide path is indicated with the aid of imaginary (chain double-dot) lines.

The split portion 4 has an outer profile (the upper and lower parts in the drawing) which is identical to that of the symmetric split portion of the conventional optical waveguide Y junction, and an inner profile (the part interposed between the core segments 5 and 6) is defined by removing, centrally about the central axial line, from the inner profile of the symmetric split portion of the conventional optical waveguide Y junction a wedge-shaped section defined by an oblique first side and a second side extending in parallel with the central axial line O. The forward end of the wedge-shaped section A is somewhat short of the starting point of the split portion 4 (where the core segment 3 starts widening toward the core segments 5 and 6). Obviously, the part other than the core segments 3, 5 and 6 and split portion 4 is occupied by the upper clad layer 9. In other words, the core segment 5 is removed by the wedge-shaped section A more than the core segment 6 is so that the split ratio between the core segments 5 and 6 is uneven, for instance at the ratio of 4 to 6.

More specifically, the width of the core segment 3 may be 8 $\mu$m, and the width a of the front end of the wedge-shaped section A may be 0 to 5 $\mu$m. The front end of the wedge shaped section A is preferably symmetric with respect to the central axial line of the input waveguide path or the core segment 3. If the rear end of the wedge-shaped section interfering with the core segment 5 is given as b, and the distance c between the central axial line O and the parallel side of the wedge-shaped section A is given as c, the width b may be selected to be (a/2+c+2) or more, and may be determined according to the desired split ratio as described hereinafter. When the width b of the rear end is less than (a/2+c+2), a stable formation of the core segments becomes difficult. The length L from the front end of the wedge-shaped section A to the rear end thereof interfering with the core segment 5 should be determined according to the front end width a, rear end width b and curvature of the core segment 5.

Figure 4:
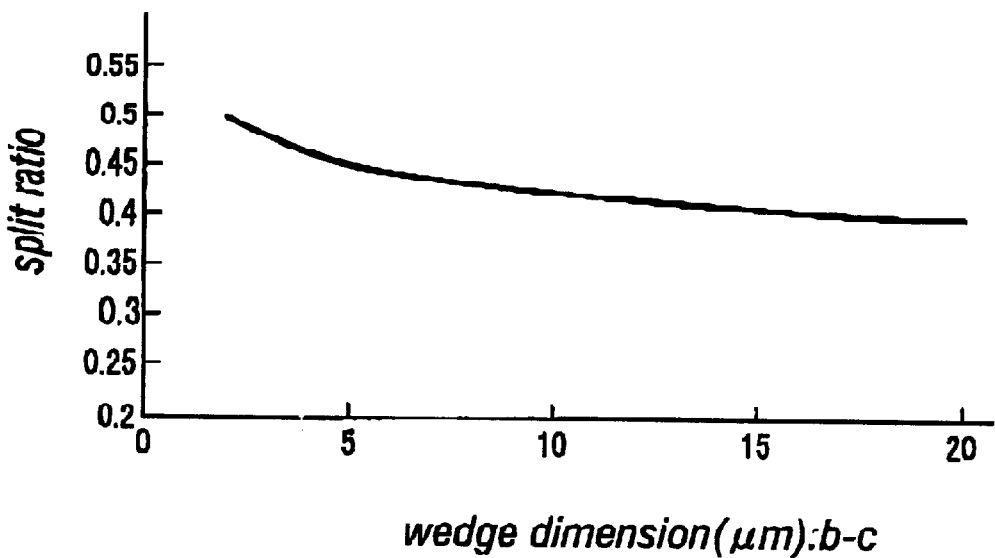
FIG. 4 is a graph showing the relationship between the split ratio and the wedge dimension (b−a) defined as the difference between the rear end width b of the wedge-shaped section A and the distance c from the central axial line to the second side of the wedge-shaped section A in the optical waveguide Y junction 1 shown in FIG. 1.

Thus, the split portion 4 can be fabricated without any substantial difficultly because the split portion 4 is provided with a shape defined by removing the trapezoidal wedge-shaped section A from the symmetric split portion. Suitably changing the rear end width b or otherwise optimizing the shape of the wedge-shaped section A allows the optical modes generated in the split portion 5 to be adjusted, and the split ratio to be controlled. FIG. 4 shows the relationship between the split ratio and the difference (b−c) between the rear end width b and the distance c of the parallel side from the central axial line. For instance, a 40% split ratio for the core segment 5 (or a 60% split ratio for the core segment 6) can be achieved by selecting the difference (b−c) to be approximately 17 μm, and the split ratio can be thus selected at will simply by changing this difference (b−c).

According to this arrangement, an optical signal having a wavelength of 1.31 μm is transmitted from an optical fiber to a light receiving element via the core segment 3, split portion 4 and core segment 5 at a power loss of 60% due to the presence of the wedge-shaped section A, but such a loss can be allowed for by limiting the transmission speed to a suitable level from the beginning. Only 40% of a light signal having a wavelength of 1.31 μm is transmitted from a light emitting element to an optical fiber via the split portion 4 and core segment 3, but this can be also allowed for by limiting the transmission speed from the beginning. These up and down signals would not cause any collisions or noises even when they have the same wavelength by suitably selecting the transmission timings.

Figure 5:
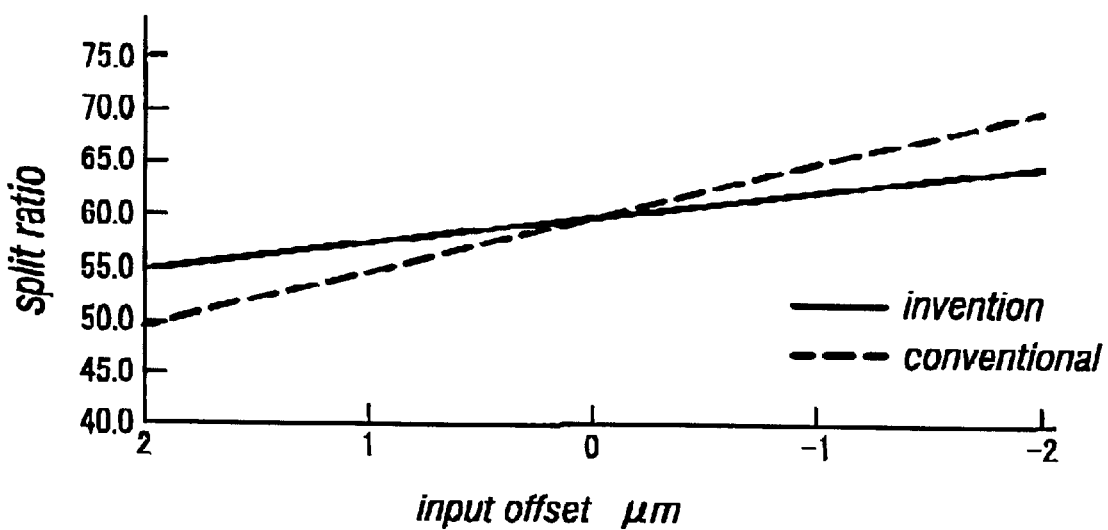
FIG. 5 is a graph showing the relationship between the split ratio and the deviation of the optical axis of the optical waveguide Y junction from the optical axial line of the optical element connected thereto.

Because the outer profile is identical to that of the hypothetical symmetric split portion of the optical waveguide Y junction, and the inner profile is defined by removing a trapezoidal wedge-shaped section from the hypothetical symmetric split portion of the optical waveguide Y junction, even when there is offsetting in the optical center line of an optical element which is connected to the input waveguide path, an influence of such an offsetting on the split ratio can be minimized. FIG. 5 shows the relationship between the offsetting of the optical center line of the light emitting element and the split ratio. It also shows the relationship between the offsetting of the center of the output waveguide paths relative to the center of the input waveguide path and the split ratio in a conventional optical waveguide Y junction having a spread out portion in the split portion (Y junction type optical tap).

As can be appreciated from this graph, although the split ratio changes more than ±10% for a ±2 μm change in the offsetting in the position of the input light signal according to the conventional optical waveguide Y junction, the changes in the split ratio can be reduced to the order of ±5% for the same change in the offsetting in the position of the input light signal in the case of the optical waveguide Y junction according to the present invention.

Now the process of fabricating the optical waveguide Y junction 1 according to the present invention is described in the following. First of all, a buffer layer 8 essentially consisting Of $SiO_2$ is formed over the surface of the substrate 2 by using flame hydrolysis deposition or CVD.

A core layer 3' again essentially consisting of $SiO_2$ is formed over the surface of the buffer layer 8. At this time, the core layer 3' is appropriately doped by using one or more of the dopants selected from a group consisting of phosphorus (P), titanium (Ti), germanium (Ge), aluminum (Al), boron (B) and fluoride (F) for the purpose of increasing the refractive index of the core layer 3' by 0.2 to 0.32% over that of the buffer layer 8.

A prescribed waveguide pattern is formed in the core layer 3' by photolithography using a photomask having a prescribed pattern, and an etching process such as RIE is applied to the assembly so as to form the waveguide core having a prescribed pattern. The mask layer is required to be consisting of a material such as photoresist or metallic material having a high etching selectivity with respect to $SiO_2$.

An upper clad layer 9 essentially consisting of $SiO_2$ having a relatively low refractive index is formed over the surface of the assembly, and this completes the fabrication of an embedded waveguide structure.

The substrate is then cut into a prescribed shape by using a dicing device, and the entire end surfaces corresponding to the end surface 3a and end surface 5a and 6a are finished into optically planar surfaces. This provides an optical waveguide Y junction 1 as illustrated in FIG. 1. An optical device is completed by mounting light receiving and light emitting elements to the terminal ends of the core segments and connecting optical fibers to them.

Although not described in any detail, it is preferable to apply a heating process and/or hot isostatic press (HIP) to the assembly prior to the dicing process so as to eliminate voids that may be formed in small gaps within the assembly and residual stress in the assembly. This contributes to the reduction in the loss of the signal light in the completed optical waveguide Y junction.

As can be appreciated from the foregoing description, according to the present invention, in the optical waveguide Y junction including an input waveguide path, a split portion for splitting a light input from the input waveguide path into two parts, and a pair of output waveguide paths for guiding the split parts of the input light, all formed in a substrate, because the split portion has an outer profile which is symmetric with respect to a central axial line of the input waveguide path and identical to an outer profile of an optical waveguide Y junction for an even split ratio, and an inner profile which is asymmetric with respect to the central axial line so that light introduced from the input waveguide path may be split into the two output waveguide paths at an uneven split ratio, the input light can be split at a desired split ratio simply by changing the inner profile without requiring any spread out portion or requiring any abrupt change in the shape of the optical waveguide paths. Therefore, the problems such as the generation of higher waveguide modes as well as undesirable changes in the split ratio due the offsetting of the incident light can be avoided. Also, even when there is offsetting in the optical center line of an optical element which is connected to the input waveguide path, an influence of such an offsetting on the split ratio can be minimized. In particular, if the inner profile is defined by removing from a side of the split portion facing the output waveguide paths a wedge-shaped section having an oblique first side and a second side extending in parallel with the central axial line, on either side of the central axial line, the design and fabrication of the junction can be simplified.

Although the present invention has been described in terms of a preferred embodiment thereof, it is obvious to a person skilled in the art that various alterations and modifications are possible without departing from the scope of the present invention which is set forth in the appended claims.

What is claimed is:

1. An optical waveguide Y junction, comprising:
   an input waveguide path;
   a split portion having one end smoothly connected to an end of said input waveguide path, and a pair of bifurcated ends; and
   a pair of output waveguide paths each having an end smoothly connected to a corresponding one of said bifurcated ends of said split portion;
   said split portion defining a modified asymmetric Y-shaped waveguide path which is defined by modifying an original symmetric Y-shaped waveguide path having a substantially constant width by removing an asymmetric wedge-shaped section from a side of said split portion interposed between said output waveguide paths.

2. An optical waveguide Y junction according to claim 1, wherein said asymmetric wedge-shaped section is defined by a first side extending obliquely away from a central axial line of said one end of said split portion, and a second side extending substantially in parallel with said central axial line, one either side of said central axial line.

3. An optical waveguide Y junction according to claim 1, wherein said waveguide paths are defined by core segments which are interposed between a substrate and upper clad layer.

4. An optical waveguide Y junction according to claim 1, wherein said asymmetric wedge-shaped section has a front end which is symmetric with respect to said central axial line and a rear end which is asymmetric with respect to said central axial line.

5. An optical waveguide Y junction according to claim 4, wherein said front end of said wedge-shaped section has a width in the range of 0 $\mu$m to 5 $\mu$m.

6. An optical waveguide Y junction according to claim 4, wherein said rear end has a width b which is equal to or greater that (a/2+c+2) where a is the width of the front end of said wedge-shaped section and c is the distance between the central axial line and second side.

7. An optical waveguide Y junction including an input waveguide path, a split portion for splitting a light input from the input waveguide path into two parts, and a pair of output waveguide paths for guiding the split parts of the input light, all formed in a substrate, characterized in that:
   the split portion has an outer profile which is symmetric with respect to a central axial line of the input waveguide path and identical to an outer profile of an optical waveguide Y junction for an even split ratio, and an inner profile which is asymmetric with respect to the central axial line so that light introduced from the input waveguide path may be split into the two output waveguide paths at an uneven split ratio.

8. An optical waveguide Y junction according to claim 7, wherein the inner profile is defined by removing from a side of the split portion facing the output waveguide paths a wedge-shaped section having an oblique first side and a second side extending in parallel with the central axial line, on either side of the central axial line.

9. An optical waveguide Y junction according to claim 8, wherein the wedge-shaped section has a front end having a width of 0 $\mu$m to 5 $\mu$m, and a rear end having a width b and interfering with the output waveguide paths, with a distance between the central axial line and second side in the rear end given as c, b being (a/2+c+2) or more and determined according to a desired split ratio to the output waveguide paths.

* * * * *